Sept. 29, 1953      A. C. BODY      2,654,019
HIGH-FREQUENCY INDUCTION-HEATING APPARATUS
Filed Oct. 6, 1950
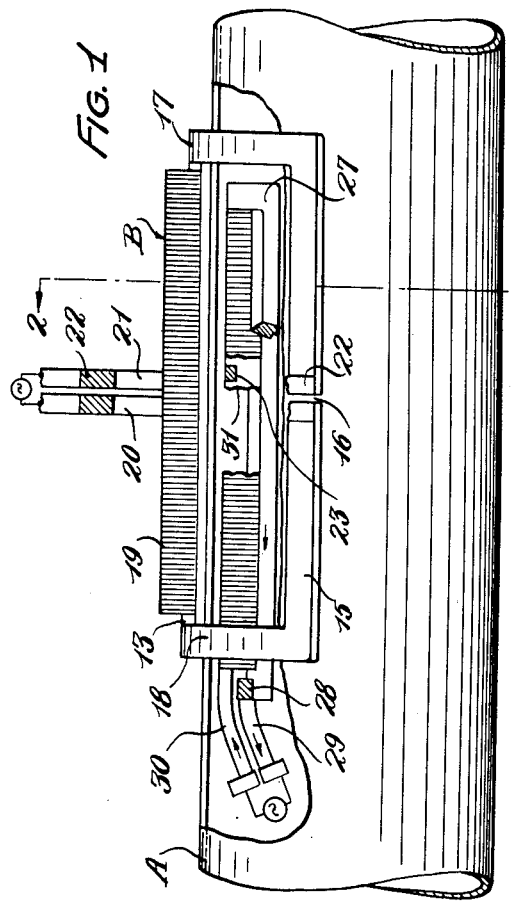
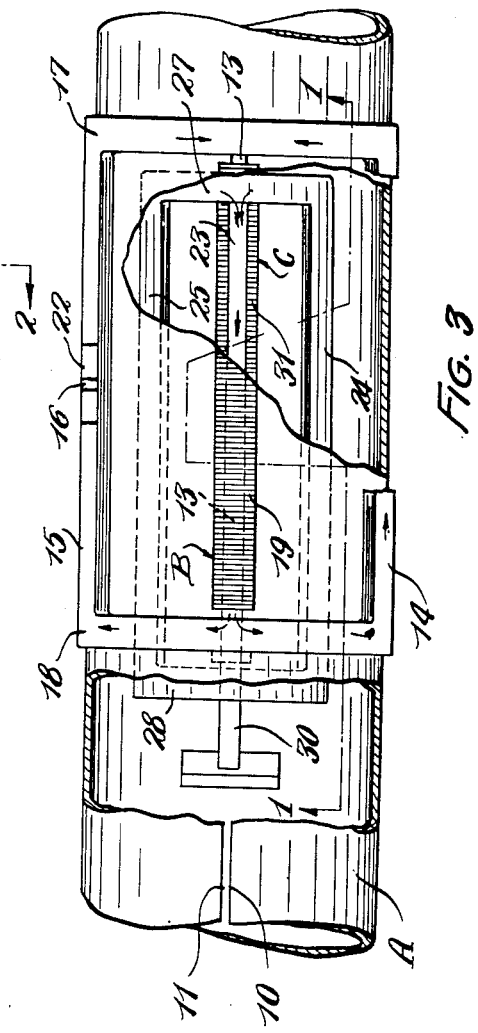
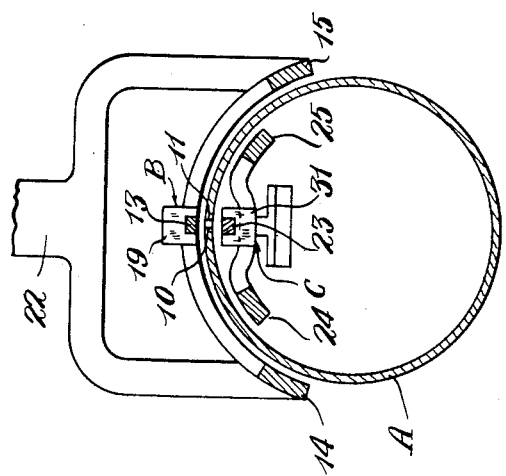
INVENTOR.
Alfred C. Body Patented Sept. 29, 1953

2,654,019

UNITED STATES PATENT OFFICE 2,654,019

HIGH-FREQUENCY INDUCTION-HEATING APPARATUS

Alfred C. Body, Cleveland, Ohio, assignor to The Ohio Crankshaft Company, Cleveland, Ohio, a corporation of Ohio Application October 6, 1950, Serial No. 188,855

3 Claims. (Cl. 219—47)

This invention pertains to the art of high-frequency induction heating and, more particularly, to the combination of a pair of high-frequency inductors adapted to be disposed on opposite sides of a metallic member for heating selected narrow elongated portions thereof.

The invention is particularly adapted to heating, prior to welding into pipe, the close-spaced edges of a C-shaped tube or skelp and the invention will be described with particular reference to such a use, although it is not so limited.

The present invention constitutes an improvement over the invention described and claimed in the copending application of Phillips N. Sorensen, Serial No. 86,066 filed April 7, 1949, now abandoned. In that application, an inductor is described for heating the close-spaced opposed edges of flat strip or sheet which has been rolled or bent into tubular form prior to the welding of the edges. The inductor there described comprises, in its principal embodiment, three conductors adapted to extend in parallel relationship along the length of the tube with the central leg opposite the opposed edges to be heated and the outer legs in equispaced relationship to the center leg and in close-spaced relationship to the sides of the tube. These conductors are connected in electrical parallel relationship by end conductors. The center leg has a stack of magnetically-permeable laminations on the outer surfaces and is divided at the middle so that the electrical connections to the inductor can be made through suitable fish-tail leads. The inductor described in this application has proven extremely effective in commercial practice to heat the opposed edges of the tube from room temperature to the welding temperature in a distance of approximately ten inches while the tube is moving at speeds in excess of 300 feet per minute.

This inductor has proven extremely satisfactory for tubes having a relatively thin wall. However, as the wall thickness increased, difficulty has been encountered obtaining an even heating over the entire radial thickness of the edge. This may be attributed to the characteristics of induced high-frequency current flow, which flow tends to cling to the outer portions of the edges adjacent to the conductor. That application also describes the possibility of employing a similar or reversed inductor on the interior of the tube for heating the inner portions of the edges with the current in the central conductors all flowing in the same direction. Thus, currents in the same direction were induced to flow along both the inner and outer portions of the edges and generally along the entire face. However, this arrangement seemed to produce the undesirable result that heating occurred in the tube remote from the edges between the side conductors of the outer inductor and the side conductors of the inner inductor. This heating was of no benefit to the welding operation and indicated an undesirable loss in electrical power.

The present invention contemplates the combination of an inductor on the exterior side of the tube and an inductor on the interior of the tube, each comprised of a plurality of conductors extending in parallel relationship with the edges to be heated, the central conductors of each inductor being disposed in direct opposite relationship on opposite sides of the edges; that is to say, in radial alignment, and the side conductors of the inductors being so arranged relative to each other that they are circumferentially spaced; that is to say, in radial disalignment. In a preferred embodiment, the three conductors of the inner inductor are in relatively close-spaced relationship while the three conductors of the outer inductor are in relatively wide-spaced relationship, the effect being to displace the side conductors relative to each other so that the currents which they individually induce to flow longitudinally of the tube are in widely-spaced portions of the tube. Along the same line, the end conductors of the inner and outer inductors are axially displaced so that the currents which they induce in the tube are also in remote portions of the tube.

The principal object of the invention is the provision of a new and improved combination and arrangement of a pair of high-frequency inductors adapted to be disposed on opposite sides of a metallic member to be heated and to heat narrow elongated portions thereof, each inductor being comprised of a central conductor and a pair of spaced parallel-extending side conductors, the central conductors of each inductor being disposed in direct opposite relationship and the side conductors of each inductor being displaced relative to each other so as not to be in direct opposite relationship.

Another object of the invention is the provision of a new and improved combination of a pair of inductors adapted to be disposed on opposite sides of a metallic member to be heated, the inductors being comprised of conductors opposite which heating is desired and other conductors opposite which no or a minimum of heating is desired, the first mentioned conductors being disposed in aligned relationship on opposite sides of the metallic member and the last mentioned conductors being disposed in disaligned relationship on opposite sides of the member.

The invention may be embodied in a number of different-appearing high-frequency inductors and combinations of such inductors, a preferred embodiment of which will be described in detail in this specification and illustrated in the attached drawings which are a part hereof, and wherein:

Figure 1 is a side elevational view partly in section of the combination of a pair of high-frequency inductors embodying the present invention;

Figure 2 is a sectional view on the line 2—2 of Figure 1; and

Figure 3 is a top elevational view of Figure 1 with portions broken away to show the relative relationship of the two inductors.

Referring now to the drawings, the figures show a tube A formed by rolling or bending flat strip or sheet so that opposite edges 10, 11 of the strip or sheet are in close-spaced opposed relationship. The tube may be of any known weldable metallic material.

A high-frequency inductor B is positioned on the outside of the tube A and a high-frequency inductor C of somewhat similar construction is disposed on the interior of the tube A. These inductors B, C are connected to a suitable source of high-frequency energy (not shown) and are so disposed relative to the tube A as to heat the opposed edges 10, 11 very rapidly while other portions of the tube remain relatively cool.

The inductor B shown comprises generally three, spaced, parallel-extending conductors; a central conductor 13 and a pair of side conductors 14, 15. Each of these conductors has a rather large cross-sectional dimension in order to carry the heavy electric current involved and each of the conductors is disposed in relatively close-spaced relationship to the sides of the tube A, the central conductors 13 being symmetrically disposed in a close-spaced relationship relative to the edges 10, 11. The three conductors are connected in electrically parallel relationship by transversely-extending end conductors 17, 18 which are generally curved to conform to the exterior surface of the tube A.

In the preferred embodiment, both side conductors 14, 15 have a split 16 somewhere along their length, preferably at the middle, and fish-tail leads 20, 21 connect to the conductors on both sides of the split. The leads extend upwardly from the split and thence horizontally across as at 22 to provide the electrical connection for the inductor.

The central conductor 13 is provided with a stack of magnetic laminations 19 along its entire length, the plane of each lamination being transverse to the length of the conductor 13. The effect of these laminations is to further concentrate the heating at the edges 10, 11. It will be noted that no laminations are shown on the side conductors 14, 15, there being no need to concentrate the heating opposite the conductors. In fact, heating opposite these conductors is considered undesirable.

The inner inductor C comprises a main or central conductor 23 and a pair of spaced parallel-extending conductors 24, 25. The three conductors 23, 24, 25 are connected together in the embodiment shown at the right-hand side by an end conductor 27 which extends arcuately to conform to the contour of the tube A. The left-hand ends of the side conductors 24, 25 are connected together by an end conductor 28, but this end conductor is in insulated relationship relative to the left end of the central or main conductor 23. A fish-tail lead 29 connects to the center portions of the end conductor 28 and another fish-tail lead 30 connects to and forms an extension of the central conductor 23. As shown, these fish-tail leads 29, 30 extend angularly away from the inner surface of the tube A on terminal blocks thereon to which suitable electrical connection can be made.

In a manner similar to the outer inductor, the central conductor 23 has a stack of magnetic laminations 31 along its length, the plane of which is transverse to the length of the conductor 23. As shown, the conductor 23 is disposed in close-spaced relationship to the inner surface of the tube A and symmetrically arranged relative to the edges 10, 11. As so disposed, the central conductor 23 is in direct opposite relationship to the central conductor 13 of the outer inductor B.

The side conductors 24, 25 are also in close-spaced relationship to the inner surface of the tube A.

Both inductors are energized from the same source of high-frequency electrical energy. Impedance-matching transformers may be employed if necessary to match the inductors to the power source. Also, one or both of these impedance-matching transformers may have a variable ratio so that the power in each inductor may be readily adjusted. The phasing of the current flow in the two inductors is quite important to the present invention and it is necessary that the currents in the central conductor 13 and the central conductor 23 at any one instant always be flowing in the same direction. With such a current flow in the conductors 13 and 23, it will be appreciated that currents will be induced to flow over the entire surface of the edges 10, 11 and all of these currents will be, at any one instant, in the same direction. If the inductor B alone were used, the currents induced by the conductor 13 would tend to hug the outer corners of the edges 10, 11 due to the proximity effect in the flow of high-frequency currents in adjacent conductors. In a like manner, the currents induced by the conductor 23 would tend to hug the inner corners of the edges 10, 11. As these currents in the inner and outer corners are in the same direction, the currents can tend to spread across the entire width of the edges 10, 11 and effect a uniform heating thereof.

If, for example, the current in the conductors 13 and 23 were in the opposite direction, the currents in the corners of the edges would thus be in opposite direction and there would have to be a neutral current flow somewhere midway along the face of the edge. The only way this portion could then be heated would be for the heat to flow by conduction, which has proven undesirable.

In the embodiment shown, it will be noted that the conductors 24, 25 of the inner conductor are spaced much closer to the central conductor 23 than are the conductors 14, 15 relative to their central conductor 13. The effect of this difference in spacing is to place the inner side conductors 24, 25 in radial disalignment or circumferentially spaced from the outer side conductors 14, 15. If these conductors were positioned in direct alignment as are the conductors 13 and 23, the current flow would tend to concentrate between the two conductors and heating would occur in the tube between the two conductors. With the conductors arranged as shown, however, the current flow induced by the inner side conductors is spaced from the current flow induced by the outer side conductors. The currents, thus, flow in a far greater area of the tube and the electrical resistance is much lower so that the resultant heating is far less. It will be appreciated that the side conductors 14, 15 could be close spaced to the central conductor 13 while the conductors 24, 25 are remotely spaced from their central conductor 23.

In the drawing, all of the conductors are shown as being of solid construction for purposes of simplicity. In an actual embodiment, these conductors would be formed of a hollow construction so that a cooling medium such as water could be continuously circulated through the interior of the conductors to remove any heat generated by the $I^2R$ losses in the conductors.

The inductors described and the arrangement of such inductors are for the purposes of illustrating the invention only. Other inductors and other arrangements of inductors will occur to others upon a reading and understanding of this specification which will differ radically in appearance from the preferred embodiment described but which still embodies the invention. It is my intention to include all such modifications and alterations as part of my invention insofar as they come within the scope of the appended claims.

Having thus described my invention, I claim:

1. In combination, a first and second inductor adapted to be disposed on opposite sides of a relatively-thin, wide and long metallic member, each of said inductors including a main or heating conductor disposed in close-spaced relationship to the surfaces of said material, said conductor being disposed in aligned opposite relationship on the opposite sides of said material, said inductors also including a plurality of other conductors extending along said material in spaced relationship to said first mentioned conductors, said last mentioned conductors of each inductor being offset relative to the conductor of the other inductor.

2. In combination, a pair of high-frequency inductors adaped to heat the opposed edges of a C-shaped tube prior to the welding of same, one of said inductors adapted to be disposed exteriorly of said tube and the other of said inductors adapted to be disposed interiorly of said tube, both of said inductors including a main heating conductor, said heating conductors extending in spaced aligned parallel relationship and adapted to receive the edges to be heated therebetween, said inductors also including a plurality of side auxiliary conductors, the corresponding auxiliary conductors of one inductor being appreciably spaced in a circumferential direction of said tube from the auxiliary conductor of the other inductor and means for energizing said inductors so that the currents in said main conductors are, at any one instant, in the same direction and the currents in the auxiliary conductors are, at any one instant, in the same direction but opposite to that of the main conductors.

3. The method of heating to the welding temperature the opposed edges of a C-shaped metallic tube which comprises inducing from both sides of said edges currents to flow along said edges in the same direction and inducing from both sides of said tube currents to flow in the opposite direction remote from said edges, but with the currents induced on the outside of said tube being circumferentially spaced from the currents induced to flow on the inside of said tube.

ALFRED C. BODY.

References Cited in the file of this patent

UNITED STATES PATENTS

| Number | Name | Date |
|---|---|---|
| 1,915,047 | Blakeslee | June 20, 1933 |
| 2,024,906 | Bennett | Dec. 17, 1935 |
| 2,086,305 | Sessions | July 6, 1937 |
| 2,460,687 | Fuchs | Feb. 1, 1949 |
| 2,467,201 | Frazier | Apr. 12, 1949 |
| 2,475,348 | Black | July 5, 1949 |